United States Patent [19]
Jändel

[11] Patent Number: 5,731,596
[45] Date of Patent: Mar. 24, 1998

[54] SUPER LATTICE OPTICAL ABSORBER

[75] Inventor: Magnus Jändel, Upplands Våsby, Sweden

[73] Assignee: Telefonaktiebolaget LM Ericsson, Stockholm, Sweden

[21] Appl. No.: 556,834

[22] Filed: Nov. 2, 1995

Related U.S. Application Data

[63] Continuation of Ser. No. 233,277, Apr. 26, 1994, abandoned.

[51] Int. Cl.$^6$ .................... H01L 29/06; H01L 31/0328; H01L 31/0336
[52] U.S. Cl. .................... 257/15; 257/17; 257/21; 257/22
[58] Field of Search .................... 257/17, 21, 22, 257/15; 359/248

[56] References Cited

U.S. PATENT DOCUMENTS

| Re. 32,893 | 3/1989 | Miller | 250/211 J |
|---|---|---|---|
| 4,546,244 | 10/1985 | Miller | 250/211 J |
| 4,582,952 | 4/1986 | McNeely et al. | 136/249 |
| 4,665,412 | 5/1987 | Ohkawa et al. | 357/6 |
| 4,720,309 | 1/1988 | Deveaud et al. | 148/33.1 |
| 4,722,879 | 2/1988 | Ueno et al. | 430/57 |
| 4,745,452 | 5/1988 | Sollner | 350/30 |
| 4,806,993 | 2/1989 | Voisin et al. | 357/4 |
| 4,827,483 | 5/1989 | Fukuzawa et al. | 372/45 |
| 5,032,710 | 7/1991 | Nojiri | 250/226 |
| 5,105,301 | 4/1992 | Campi | 359/245 |
| 5,117,477 | 5/1992 | Satoh | 385/88 |

FOREIGN PATENT DOCUMENTS

| 0 385 685 | 9/1990 | European Pat. Off. |
| 2 229 287A | 9/1990 | United Kingdom . |

OTHER PUBLICATIONS

Applied Physics Letters, 20 Feb. 1989, U.S.A., vol. 54, No. 8, ISSN 0003-6951, pp. 748-750 XP000111739, G. LIVESCU et al., "High-Speed Absorption Recovery in Quantum Well Diodes by Diffusive Electrical Conduction."

Mendez et al., "Stark Localization in GaAs-GaAlAs Superlattices under an Electric Field," *Physical Review Letters*, vol. 60, No. 23, 6 Jun. 1988, pp. 1-4.

Levine et al., "New 10μm Infrared detector using intersubband absorption in resonant tunneling GaAlAs superlattices," *Applied Physics Letters*, 50(25), 20 Apr. 1987, pp. 1814-1816.

N.K Dutta, "Calculated absorption, emission, and gain in $In_{0.72}Ga_{0.28}As_{0.6}P_{0.4}$," *J. Appl. Phys. 51(12)*, Dec. 1980, pp. 6095-6100.

F. Devaux et al., "High-Frequency Operation of a Very Low Voltage, 1.55μm Single-Mode Optical Waveguide Modulator Based on Wannier-Stark Localization", 8th International Conference on Integrated Optics and Optical Fibre Communication IOCC '91 -17th European Conference on Optical Communication ECOC '91, Paris, France, vol. 3, pp. 56-59 (Sep. 9-12, 1991).

Thomas H. Wood et al., "Electric field screening by photogenerated holes in multiple quantum wells: A new mechanism for absorption saturation," *Appl. Phys. Lett. 57(11)*, 10 Sep. 1990, pp. 1081-1083.

Suzuki et al., "Effect of Hole Pile-Up at Heterointerface on Modulation Voltage in GaInAsP Electroabsorption Modulators," *Electronics Letters*, vol. 25, No. 2, 19th Jan. 1989, pp. 88-89.

Wood et al., "Increased Optical Saturation Intensities in GaInAs Multiple Quantum Wells by the Use of AlGaInAs Barriers," *Electronics Letters*, vol. 27, No. 3, 31st Jan. 1991, pp. 257-259.

(List continued on next page.)

*Primary Examiner*—William Mintel
*Attorney, Agent, or Firm*—Burns, Doane, Swecker & Mathis, L.L.P.

[57] ABSTRACT

A method of increasing the saturation threshold of a super lattice optical absorber, and a resulting super lattice optical absorber, involves decreasing the electrical resistance of the substrate adjacent the super lattice structure based on a series resistance model.

10 Claims, 1 Drawing Sheet

OTHER PUBLICATIONS

Robert T. Bate, "the Quantum–Effect Device: Tomorrow's Transistor?",*Scientific American*, vol. 258 Mar. 1988, pp. 96–100.

H. Kano et al., "Negative Differential Resistance Device Built in A Biwell GaAs/AlGaAs Superlattice," *Journal of Crystal Growth 81*, (1987) pp. 144–148.

T. Nakagawa et al., "Thermally stimulated resonant current in AlGaAs/GaAs triple barrier diodes," *Appl. Phys. Lett. 51(8)*, 10 Aug. 1987, pp. 445–651.

D.D. Coon et al., "New Mode of IR Detection Using Quantum Wells," *Appl. Phys. Lett. 45(6)*, 15 Sep. 1984, pp. 649–651.

D.D. Coon et al., "Narrow band infrared detection in multiquantum well structures," *Appl. Phys. Lett. 47(3)* 1 Aug. 1985, pp. 289–291.

Elizabeth Corcoran, "Diminishing Dimensions," *Scientific American*, vol 263, Nov. 1990, cover page, pp. 122–131.

G.H Döhler, "Solid–State Superlattices",*Scientific American*, vol 249, No. 5, pp. 3, 144–151 and 198.

G. Hasnain et al., "Mid–infrared dectors in the 3–5 µm band using bound to continuum state absorption in InGaAs/InAlAs multiquantum well structure," *Applied Physics Letters 56(8)*, Dec. 19, 1990, pp. 770–772.

R.P. Leavitt et al., "Stark ladders in strongly coupled superlattices and their interactions with embedded quantum wells," *Physical Review B*, vol. 41, No. 8, 15 Mar. 1990, pp. 5174–5177.

B.F. Levine et al., "New 10µm infrared detector using intersubband absorption in resonant tunneling GaAlAs superlattices," *Applied Physics Letters 50(25)*, 20 Apr. 1987, pp. 1814–1816.

B.F. Levine et al., "High–detectivity D* =1.0×10$^{10}$cm Hz/WGaAs/AlGaAs multiquantum well≳=8.3 µm infrared detector," *Applied Physics Letters 53(4)*, 25 Jul. 1988, pp. 296–298.

B.F. Levine et al., "High sensitivity low dark current 10µm GaAs quantum well infrared photodetectors," *Applied Physics Letters 56(9)*, Feb. 26, 1990, pp. 851–853.

E.E. Mendez et al., "Stark Localization in GaAs–GaAlAs Superlattices under an Electric Field," *Physical Review Letters*,vol. 60, No. 23, 6 Jun. 1988, (4 pages).

H. Sakaki et al., "Energy levels and electron wave functions in semiconductor quantum wells having superlattice alloy–like material (0.9 nm GaAs/0.9 nm AlGaAs) as barrier layers," *Appl. Phys. Lett. 47(3)*, 1 Aug. 1985, pp. 295–297.

M. Sundaram et al., "New Quantum Structures," *Science*, vol. 254, 29 Nov. 1991, oo. 1326–1335.

J.A. Switzer et al., "Electrodeposited Ceramic Superlattices," *Science*, vol. 247, 26 Jan. 1990, pp. 444–445.

S.R. Eric Yang et al., "Theory of conductivity in superlattice minibands," *Physical Review B*vol. 37, No. 17, 15 Jun. 1988, pp. 10090–10094.

Larry S. Yu et al., "A metal grating coupled bound–to–miniband transition GaAs multiquantum well/superlattice infrared detector," *Appl. Phys. Lett. 59(11)*, 9 Sep. 1991, pp. 1332–1334.

Larry S. Yu et al., "Largely enhanced bound–to–miniband absorption in an InGaAs multiple quantum well with short–period superlattice InAlAs/InGaAs barrier," *Appl. Phys. Lett. 59(21)*, 18 Nov. 1991, pp. 2712–2714.

L.C. West et al., "First observation of an extremely large–dipole infrared transition within the conduction band of a GaAs quantum well," *Appl. Phys. Lett. 46(12)*, 15 Jun. 1985, pp. 1156–1158.

Claude Weisbuch et al., "Quantum Semiconductor Structures," *Fundamentals & Applications*, Boston, Academic Press, 1991, pp. 19–20.

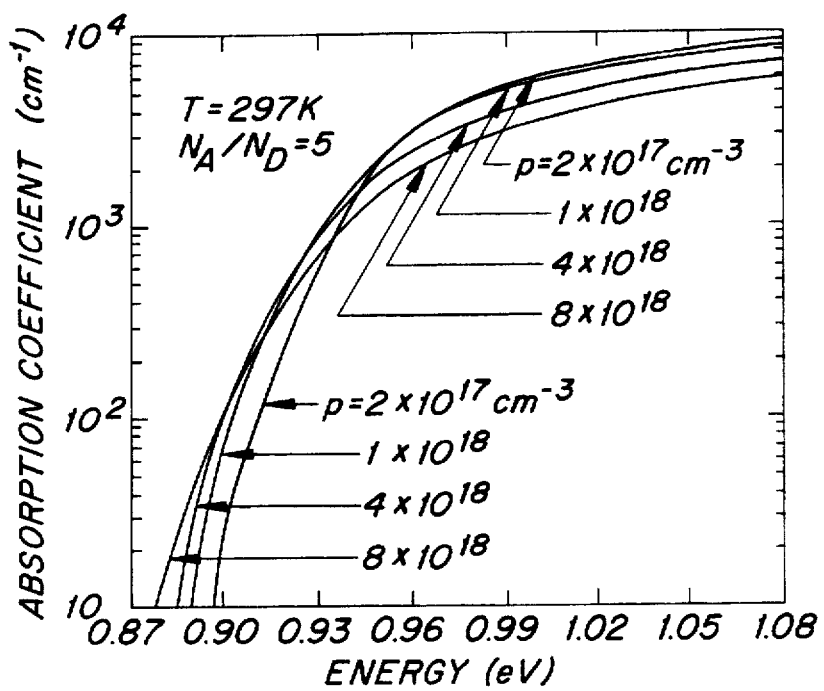
Fig. 1
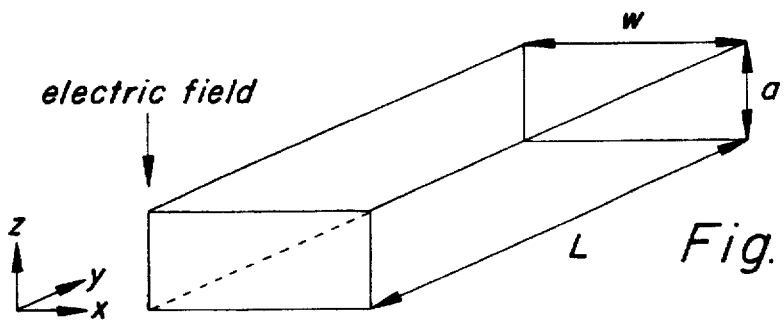
Fig. 2
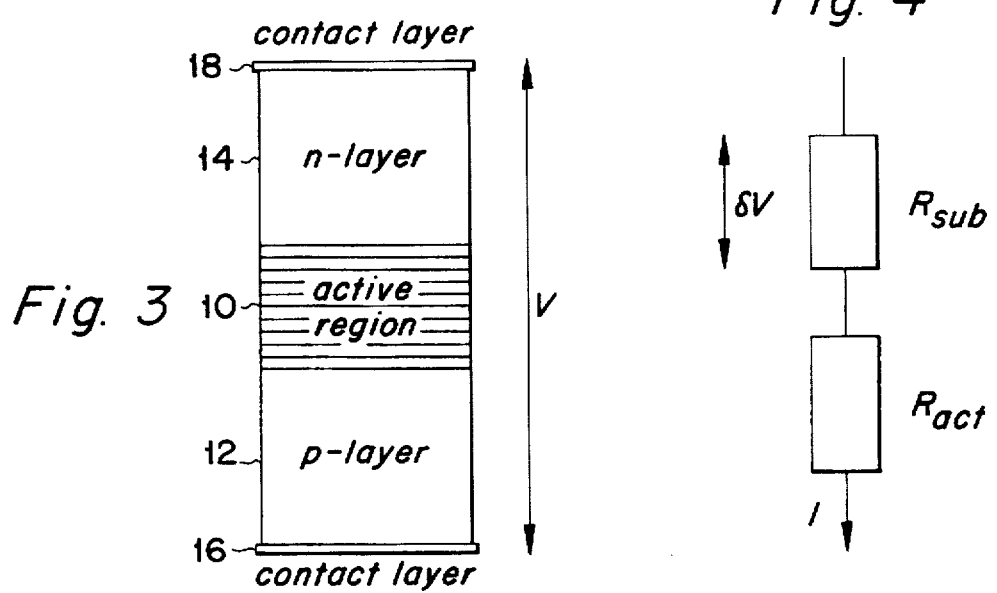
Fig. 3
Fig. 4

SUPER LATTICE OPTICAL ABSORBER

This application is a continuation of application Ser. No. 08/233,277, filed Apr. 26, 1994, now abandoned.

BACKGROUND OF THE INVENTION

1. Field of the Invention

The present invention relates to a super lattice (SL) optical absorber, and method for increasing the saturation threshold thereof, for use in devices such as optical switches/modulators.

2. Discussion of Related Art

Electro-absorption modulators are used in such devices as bidirectional data links, optical interconnects for electronic circuits and telecommunication switching matrices.

A high speed modulator is a key device for future long distance and multi-Gbit/s optical telecommunication systems. Electro-absorption modulators are, in particular, interesting since they can be closely integrated with single wavelength lasers. For long distance communication it is essential to have high electro-absorption performance at high input optical powers. The present invention is useful in this context since it solves the problem of increasing the absorption threshold in electro-absorption modulators.

Saturable absorbers are used in the mode-locked lasers and optical logic elements. The present invention shows how the saturation threshold can be controlled by changing substrate properties.

Super lattice absorbers saturate at high optical powers. This effect is a major obstacle for many applications. For instance, it limits the ON/OFF ratio of electro-absorption modulators at high input intensities.

Several groups have found that the absorption coefficient (a measure of the ability of the SL to absorb light) decreases as the optical intensity increases over a certain threshold. Wood et al., "Increased Optical Saturation Intensities in GaInAs Multiple Quantum Wells By The Use of AlGaInAs Barriers," *Electronics Letters*, Vol. 27, No. 3, Jan. 31, 1991, pages 257–259; Wood et al., "Electric Field Screening By Photogenerated Holes in Multiple Quantum Wells: A New Mechanism For Absorption Saturation," *Appl. Phys. Lett.* 57(11), Sep. 10, 1990, pages 1081–1083; Suzuki et al., "Effect of Hole Pile-Up at Heterointerface on Modulation Voltage in GaInAsP Electronabsorption Modulators," *Electronics Letters*, Vol. 25, No. 2, Jan. 19, 1989, pages 88–89; and Devaux et al., "High-Frequency Operation of Very Low Voltage, 1.55 μm Single Mode Optical Waveguide Modulator Based on Wannier-Stark Localization," 8th International Conference on Integrated Optics and Optical Fibre Communication IOOC '91—17th European Conference on Optical Communication ECOC '91, Paris, France, Vol. 3, pages 56–59 (Sep. 9–12, 1991).

The saturation effect is typically explained as an effect of a large concentration of holes in the active region of the device. In other words, the conventional explanation for SL saturation is that holes pile up in the active region and destroy or shield the applied field. The present invention, however, is based on a different theory resulting from a critical examination of the conventional assumption, as follows.

Electrons move 10–100 times faster than holes in typical semiconductor devices. However, the mobilities of electrons and holes in a SL device are a complex and largely unknown quantity but the results of Bastard and coworkers (G. Bastard et al., *Solid State Physics*, Ed. H. Ehrenreich and D. Turnbull, Academic Press, 1991), point to the surprising conclusion that holes travel about as fast as electrons in a strongly coupled InGaAsP SL device.

For purposes of explaining the conventional theory, it is assumed in this section that holes are much slower than electrons in SL devices. Absorbed light is converted to electrons and holes in equal numbers within the active region of the device. As the charge carriers are transported out of the active region it is assumed the electrons race ahead of the holes. It follows that an electric field is set up which will slow down the electrons while the holes are dragged along by the field. If the charge carriers move in the external field of the SL absorber, an additional field that is caused by the great difference in mobility between electrons and holes is opposite in direction to the external field. The effective field that acts on the SL is hence decreasing with increasing charge carrier density.

Increasing the absorbed power in an SL device means therefore an increasing net charge density in the active region and a decreasing effective electric field. As the absorption coefficient decreases with decreasing electric field, this might explain the observed saturation effect. In the following, the size of this effect is estimated within the framework of a simple theoretical model.

As a first approximation it is assumed that electrons are instantly removed from the active region so that the remaining charge density consists entirely of holes. Gauss' law is applied to find the electric field $E_{ind}$ that is induced by the holes in the active region:

$$E_{ind} = 2\pi a n_h$$

where a is the transverse dimension of an SL active region and $n_h$ is the density of holes (using atomic units for all quantities). The potential difference across the active region that is caused by the stuck holes is of the order $\phi_{ind} = aE_{ind}$.

The critical density, $n_c$, is defined as the minimum stuck holes density that is sufficient to significantly reduce the absorption coefficient of the device. Let $\delta\phi$ be the maximum allowed reduction of the potential across the device. The maximum allowed net charge density in the active region is hence, $$n_{max}(cm^{-3}) = 1.1 \times 10^{22} \delta\phi(V)/a^2(\text{Å}),$$

where the units to be used are indicated for each quantity. Assuming that the required potential is 3 V in the absorbing mode and that a 10% reduction is acceptable, the result is $\delta\phi = 0.3$ V. A typical device has a transverse thickness a=500 Å. The maximum allowed net density is in this case $n_{max} = 1.3 \times 10^{16}$ cm$^{-3}$.

The charge carrier density can be estimated for a typical device to be $10^{12}$ cm$^{-3}$. This is much smaller than the critical density $n_{max}$. In fact, the present estimate of the hole mobility has to be reduced by a factor of $10^{-4}$ in order to get a significant "stuck holes" effect. Thus, this analysis indicates that the stuck hole effect is not the dominant reason for SL saturation.

Similarly, it appears that the ambipolar diffusion model does not fully explain SL saturation. If ambipolar diffusion (in the transverse or lateral direction) were the dominating transport, a resulting induced electric field would still be expected. A simple model for this phenomenon is outlined below.

In a dilute gas of electrons and holes, charged particles interact with background scatterers and not with each other. It is assumed that the diffusion coefficient of the electrons is much larger than the diffusion coefficient of the holes ($D_e > D_h$). The mobilities $\mu_e$ and $\mu_h$ of electrons and holes respectively are assumed to be related to the diffusion coefficients by the Einstein relation $\mu_i = D_i/kT$ where T is the temperature. It is further assumed that a nonequilibrium distribution of electrons and holes are established in a region with a typical length scale L. In an SL device, L would be the transverse or lateral size of the active region.

The codiffusion of electrons and holes under the influence of the induced electric field is under these assumptions described by the theory of ambipolar diffusion. Some crucial aspects of this theory is highlighted below.

The electrons reach an equilibrium distribution after a time $\tau_e = L/D_e$ while the corresponding relaxation time for the holes is $\tau_h = L/D_h > \tau_e$. The electrons will hence first reach an equilibrium distribution with respect to the holes. The electron distribution follows then closely the hole distribution which evolves on the longer time scale $\tau_h$. It is easy to show that the joint movement of the charge carriers is described by a diffusion constant $D_a = 2D_i$.

To estimate the induced field under ambipolar diffusion the equation of continuity for the electrons, is $$i_e = -n_e \mu_e eE - D_e \nabla n_e$$

where $n_e$ is the conduction electron density. As the electrons at any moment can be assumed to be in statistical equilibrium it can be assumed that the electron current $i_e$, vanishes (the electron current is about $D_i/D_e \sim 10^{-2}$ times smaller than the leading terms of the equation). The electric field required to balance the diffusion term is $E = kT/L$.

The total potential drop due to the "stuck holes effect" across the active region is hence of the order $\delta = EL = kT$. Note that this result is independent of the detailed transport parameters and of the carrier density.

It is sufficient that the movement of the charge carriers can be approximately described by an effective diffusion constant and that Einstein's relation holds.

$\delta V$ is at room temperature 25 mV while the applied voltage is 1–5V. The ambipolar diffusion effect seems to be too small to explain the observed saturation phenomenon.

SUMMARY OF THE INVENTION

The present invention addresses the problem existing in prior super lattice absorbers wherein the optical absorption coefficient decreases with increased absorbed power. This reduces the applicability of SL optical absorbers in, e.g., optical switches, which are limited by a saturation effect which sets an upper limit to the absorbed optical power.

The present invention is based on the conclusion that the saturation threshold can be increased by decreasing the resistance of the substrate. This can be done by making the substrate thinner or increasing the doping level in the substrate. It is projected that an increase in the doping level by at least a factor of 10 would give a 10 fold increase in the power absorption threshold.

In summary, the invention can be described as a method of forming a super lattice optical absorber wherein the desired saturation threshold of P photons per second involves the step of selecting a substrate size and doping level so that:

$$R_{SUBS} < \frac{6*10^{17} \Omega s^{-1}}{P}$$

where $R_{SUBS}$ is the substrate resistance in ohms and P is a desired saturation threshold in photons per second.

BRIEF DESCRIPTION OF THE DRAWINGS

The present invention will now be described with reference to the accompanying drawings in which:

FIG. 1 is a graph of calculated absorption curves for p-type InGaAsP ($\lambda = 1.3$ μm) for different majority carrier concentrations, wherein the majority carrier density $p = N_A - N_D$;

FIG. 2 is a diagram showing the relative dimensions of a SL absorber;

FIG. 3 is a diagram of a super lattice optical absorber in accordance with the present invention; and FIG. 4 is a schematic equivalent of FIG. 2.

DESCRIPTION OF THE PREFERRED EMBODIMENTS

The present inventor has discovered the saturation effect can be better explained by a series resistance model of the observed saturation effect. The conventional theory is that heavy holes get stuck in the active section of the absorber. The resulting induced electric field, according to this theory, destroys the external field that is necessary for maintaining the high absorption coefficient. However, it has recently been shown that heavy holes are much more mobile than conventionally assumed. Hence, it appears that the conventional theory for saturation effect may be incorrect.

The alternative explanation is based on the series resistance model in which it is shown that the external electric field in the active region is reduced because electron-hole pairs are created as photons are absorbed. This creates an induced current within the absorber. As the substrate has a significant resistance, a large fraction of the potential drop will be located in the substrate. Increasing the absorbed power requires an increase in the induced current and consequently an induced potential drop over the substrate. This results in a reduced electric field in the active part of the absorber.

The present invention is based on the conclusion that the saturation threshold can be increased by decreasing the resistance of the substrate. This can be done by either making a substrate thinner than typical or increasing the doping level in the substrate to greater than normal. It is possible to increase the doping level by at least the factor of 10, which would give a 10 fold increase in the power absorption.

To discuss the dynamical behavior of SL absorbers, the order of magnitude of some quantities are presented with reference to FIG. 3. The active region of an exemplary device has a length $L = 100$ μm in a longitudinal direction and a width $w = 2$ μm in the lateral direction, as shown in FIG. 2. The typical device may consist of ten (10) SL planes, each plane having a thickness $d = 50$ Å giving a total thickness $a = 10 \times d = 0.05$ μm in the transverse direction. The total volume is hence $V_T = awL = 10(\mu m)^3$.

For purpose of this discussion, the device is assumed to have an absorption coefficient of $\alpha = 100$ cm$^{-1}$ in the absorbing mode. This means that the bulk of the absorption occurs within the first 100 μm of the absorbing material.

The absorbed peak may be taken to be $P = 30$ mW corresponding to a photon absorption rate of $P_\gamma = 2 \times 10^{17}$ γ/s at a wavelength of 1.3 μm. This means that the charge carriers are created at a rate of $R_{cc} = 10^{28}$ cm$^{-3}$s$^{-1}$ within the active volume $V_T$. A potential of typically $V_{ext} = 2.5$ V is applied along the z-axis.

A useful modulation rate would be about 10 GHz which corresponds to a typical modulation time scale of $\tau_m = 10^{-10}$s. The relaxation time of the induced charge carriers in the absorber should preferably be much smaller than $\tau_m$. Both light holes (lh) and heavy holes (hh) are produced in the absorption process. Light and heavy holes are, however, mixed rapidly by the electron-electron and electron-photon scattering on a timescale of $10^{-13}$–$10^{-12}$s. For purposes of discussion, it is sufficient to consider a thermalized population of light and heavy holes.

The dynamical behavior of interest with respect to the present invention is the observed saturation of the absorber at high power and the relaxation time. A key issue is the fate of the induced charge carriers.

There are mechanisms for removing electrons and holes from the active region of the SL absorber, a.k.a. charge carrier loss mechanisms, which include recombination, diffusion, and transverse conduction. A comparison of the various escape routes for the charge carriers reveals that transport by transverse conduction along the SL device dominates when an electric field is applied while diffusion is important when the electric field is not applied.

Recombination room temperature in a InCaAsP semiconductor device is mainly caused by the Auger mechanism. The recombination rate per unit volume has been estimated to be $R_A = Cn^3$, where n is the charge carrier density and $C = 10^{-29}$ cm$^6$S$^{-1}$. Assuming a steady state situation in the active absorbing volume $V_T$ where the creation rate $R_{cc}$ equals the recombination rate $R_A$, the induced carrier density is $10^{19}$ cm$^{-3}$ and the carrier lifetime due to Auger recombination is only $t_A = 10^{-9}$S$^{-1}$. Thus, recombination does not appear to be a dominant charge carrier loss mechanism.

In diffusion, the charge carriers are transported out of the active region by diffusion at a rate that can be estimated using Fick's law $$i = -D\bar{V}n.$$

Assuming that a size of the domain s where the density has not yet reached statistical equilibrium, the equation results in $i \cong D$ n/s. The rate of carrier loss by diffusion in the lateral direction (x-axis) can hence be $R_y = 2aLD_yn/w$ where $d_y$ is the diffusion coefficient in the lateral direction.

In the transverse direction (z-axis) a corresponding transport rate $R_z = 2wLD_zn/a$ is evident. The relative importance of the diffusion loss is in the lateral and transverse directions are hence $R_y/R_z = (a/w)^2(D_y/D_z)$.

Using the assumed dimensions, $(a/w)^2 = 1/1600$ while $D_y/D_z$ approximates unity according to the Einstein relation $\mu = D/kT$. See FIG. 1 for mobilities. Thus, it can be concluded that the diffusion in the transverse direction (z-axis) dominates. Assuming the transverse diffusion dominates, the induced charge carrier density n is then approximate $aP/2wLD_z \sim 10^{14}$ cm$^{-3}$ where the numerical estimate assumes the parameters mentioned above for a typical device. The carrier lifetime due to the diffusion is hence $\tau_d \sim nV_T/P \sim 10^{-4}$s.

Carrier transport by transverse conduction occurs as the external electric field is applied in the direction of the z axis. The current is $i = n\mu eE$, where E is the applied field. The resulting carrier loss rate is $R_{cond} = 2wLN\mu eE = (2wLD_zn/a)(eEA/kT)$. The corresponding charge carrier density is $n \sim (AP/2wLD_z)(kT/eEa) \sim 10^{12}$ cm$^{-3}$ where again the parameters of the typical device are assumed (e.g., $V_{ext} = Ea = 2.5$ V). The carrier lifetime due to the transverse conduction is hence $\tau_d \sim nV_T/P \sim 10^{-16}$ s.

This indicates that transport by transverse conduction along the SL device dominates when an electric field is applied while diffusion is important when the electric field is not applied.

The following explains the series resistance model of an active layer in an SL device surrounded by p and n doped layers.

With reference to FIG. 3, the active layer or region 10 in a super lattice device is surrounded by P and N doped layers 12 and 14. The P and N doped layers may be thinner than 0.2 µm and may have a doping level of less than $10^{17}$ cm$^{-3}$. The contact layers 16 and 18 are used to establish an external electric field. A simple model of the electrical properties is that the external potential V causes a current I through resistances.

As shown in FIG. 3, the resistance of the active layer $R_{ACT}$ and the combined resistance of the p layer 12 and the n layer 14 is combined to form substrate resistance $R_{SUBS}$.

Ignoring the effect of recombination of holes and electrons, a current I flows through to the device according to the equation (Equation 1):

$$I = 2 \times 1.6 \times 10^{-19} P$$

wherein P equals the photons per second absorbed in the active region. According to Ohm's Law, the reduction in the potential that is applied over the active region is equal to the potential over the substrate resistance $R_{SUBS}$, thus resulting in the equation $$\gamma V = R_{SUBS} I.$$

Thus, the desired saturation threshold of P photons per second can be achieved by selecting a substrate size and/or doping level so that:

$$R_{SUBS} < \frac{6 * 10^{17} \Omega s^{-1}}{P}$$

where $R_{SUBS}$ is the substrate resistance in ohms ($\Omega$) and P is a desired saturation threshold in photons per second (S$^{-1}$). This equation is derived by inserting Equation 1 into Ohm's Law under the constraint that $\delta V$ is too small to change the absorption properties of the device.

In an exemplary device detailed above, the current I equals 64 mA. The resistance of this substrate are $R_{SUBS}$ can be estimated to be in the order of 10$\Omega$ based on an assumed doping level $10^{17}$ cm$^{-3}$. The resistance of the substrate has been measured to be as low as 6$\Omega$. The estimated potential reduction due to the series resistance effect would then be approximately 0.4 V. This is a large fraction of the total applied voltage, and hence it can be expected that the saturation effects will occur.

Improved dynamical performance of the SL device can be achieved by an SL device wherein the inactive layers 16 and 18 have as small a resistance as possible. This can be achieved by increasing the doping level in the n and p layers 16 and 18.

The resistance of the inactive domain is inversely proportional to the charge carrier density, $R_{SUBS} = \sim 1/n_{SUBS}$. Increasing the doping level would, however, both decrease the resistance and increase the absorption in the inactive layers.

The total absorption coefficient can be written, $$\alpha = \Gamma a_{ACT} + (1 - \Gamma) a_{SUBS}$$

where $\Gamma$ is the confinement factor and $a_{ACT}$ and $a_{SUBS}$ are the absorption coefficients in the active and inactive regions, respectively. Assuming that the band gap of the inactive domain is larger than the absorbed frequency, $a_{SUBS}$ should increase with increasing doping level. If confining SL materials are used, a more complex relation can be expected.

Under the series resistance model, it is the doping level (or thickness) of the inactive region that controls the balance between saturation level and background absorption. The estimated $R_{SUBS}$ above is based on a doping level of $10^{17}$ cm$^{-3}$. According to FIG. 1 (N. K. Dutta, "Calculated Absorption, Emission, and Gain in $In_{0.72}Ga_{0.28}As_{0.6}P_{0.4}$," *J. Appl. Phys.*, Vol. 51, No. 12, pp. 6095–100, Dec. 1980), it appears that the doping level could be increased by at least an order of magnitude, which would allow a tenfold increase in the absorbed power.

Many embodiments of the present invention may be constructed without departing from the spirit and scope of the present invention. It should be understood that the present invention is not limited to the specific embodiments described in the specification, but rather the appended claims.

I claim:

1. A method of controlling an absorption threshold of a super lattice optical absorber, said absorber including a substrate comprising at least a first semiconductor layer and a second semiconductor layer, comprising the steps of:

selecting a predetermined electrical resistance for said substrate to provide said absorption threshold;

forming said first semiconductor layer as a stacked layer structure of a first conductivity type;

forming an active layer in operative contact with said first semiconductor layer for absorbing photons; and forming said second semiconductor layer of a second conductivity type different from said first conductivity type in operative contact with said active layer, wherein said steps of forming provide a substrate having said absorption threshold.

2. A method according to claim 1, wherein said step of selecting said electrical resistance includes selecting a thickness of at least one of said first and said second semiconductor layers.

3. A method according to claim 1, wherein said step of selecting said electrical resistance includes selecting a doping level of at least one of said first and said second semiconductor layers.

4. A method according to claim 1, wherein said electrical resistance of said substrate is:

$$R_{SUBS} < \frac{6*10^{17} \Omega s^{-1}}{P}$$

where $R_{SUBS}$ is the combined resistance of said first and second semiconductor layers resistance in ohms and P is a desired saturation threshold in photons per second.

5. A method of matting a super lattice optical absorber, said absorber including a substrate comprising at least a first semiconductor layer and a second semiconductor layer, comprising the steps of:

selecting a predetermined electrical resistance for said substrate to provide a saturation threshold;

forming said first semiconductor layer as a stacked layer structure of;

forming an active layer in operative contact with said first semiconductor layer for absorbing photons; and forming said second semiconductor layer in operative contact with said active layer, wherein said steps of forming provide a substrate having said saturation threshold.

6. A method according to claim 5, wherein said step of selecting an electrical resistance includes selecting a thickness of at least one of said first and said second semiconductor layers.

7. A method according to claim 5, wherein said step of selecting an electrical resistance includes selecting a doping level of at least one of said first and said second semiconductor layers.

8. A method according to claim 5, wherein said electrical resistance of said substrate is:

$$R_{SUBS} < \frac{6*10^{17} \Omega s^{-1}}{P}$$

where $R_{SUBS}$ is the combined resistance of said first and second semiconductor layers in ohms and P is a desired saturation threshold in photons per second.

9. A method of controlling an absorption threshold of a super lattice optical absorber, said absorber including a substrate comprising at least a first semiconductor layer and a second semiconductor layer, comprising the steps of:

selecting an electrical resistance for at least one of said first and second semiconductor layers;

forming said first semiconductor layer;

forming an active layer for absorbing photons; and forming said second semiconductor layer, wherein said first semiconductor layer, said active layer in operative contact with said first semiconductor layer, and said second semiconductor layer in operative contact with said active layer are in a stacked layer structure, and wherein the electrical resistance of at least one of said first and second semiconductor layers is selected to control the saturation threshold.

10. A method according to claim 9, wherein said electrical resistance of said substrate is:

$$R_{SUBS} < \frac{6*10^{17} \Omega s^{-1}}{P}$$

where $R_{SUBS}$ is the combined resistance of said first and second semiconductor layers in ohms and P is a desired saturation threshold in photons per second.

* * * * *